(12) United States Patent
Ohtsuka

(10) Patent No.: US 9,375,870 B2
(45) Date of Patent: Jun. 28, 2016

(54) BLOW-MOLDING MOLD

(71) Applicant: HONDA MOTOR CO., LTD., Tokyo (JP)

(72) Inventor: Kuniyuki Ohtsuka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/772,446

(22) PCT Filed: Jan. 15, 2014

(86) PCT No.: PCT/JP2014/050512
§ 371 (c)(1),
(2) Date: Sep. 3, 2015

(87) PCT Pub. No.: WO2014/136474
PCT Pub. Date: Sep. 12, 2014

(65) Prior Publication Data
US 2016/0009019 A1   Jan. 14, 2016

(30) Foreign Application Priority Data

Mar. 5, 2013  (JP) .................................. 2013-042748

(51) Int. Cl.
*B29C 49/20* (2006.01)
*B29C 49/42* (2006.01)
*B29C 49/56* (2006.01)
*B29L 31/00* (2006.01)
*B29C 49/04* (2006.01)
(Continued)

(52) U.S. Cl.
CPC ................. *B29C 49/56* (2013.01); *B29C 49/20* (2013.01); *B29C 49/04* (2013.01); *B29C 49/4802* (2013.01); *B29C 49/60* (2013.01); *B29C 2049/2017* (2013.01); *B29C 2049/2073* (2013.01); *B29L 2022/00* (2013.01); *B29L 2031/7172* (2013.01)

(58) Field of Classification Search
CPC ............... B29C 2049/2017; B29C 2049/2065; B29C 2049/2468; B29C 49/4236; B29C 49/4252; B29C 49/56; B29L 2031/7122
See application file for complete search history.

(56) References Cited

U.S. PATENT DOCUMENTS 2,919,470 A * 1/1960 Deters .................... B29C 33/48
249/103
3,570,057 A * 3/1971 Doyle .................... B29C 49/48
425/522
(Continued)

FOREIGN PATENT DOCUMENTS

JP  63-62733  3/1988
JP  7-171885  7/1995
(Continued)

OTHER PUBLICATIONS

International Search Report, Date of mailing: Feb. 25, 2014.

*Primary Examiner* — Robert B Davis
(74) *Attorney, Agent, or Firm* — Rankin, Hill & Clark LLP

(57) ABSTRACT

A blow-molding mold provides a mobile nest in which an insert member is set. The back side of the divisional mold is provided with a locking device. The locking device includes an air cylinder unit and a guide block, the axial direction of the air cylinder unit is at right angles to the forward and back direction of the nest, a rod of the air cylinder unit penetrates through the guide block, and the air cylinder unit and the guide block are provided in both sides of plate.

6 Claims, 3 Drawing Sheets

(51) Int. Cl.
*B29C 49/48* (2006.01)
*B29C 49/60* (2006.01)
*B29L 22/00* (2006.01)

(56) References Cited

U.S. PATENT DOCUMENTS

| | | | | | |
|---|---|---|---|---|---|
| 5,188,981 | A | * | 2/1993 | Stiles | B60K 15/03177 428/309.9 |
| 5,736,168 | A | * | 4/1998 | Goyal | B29C 33/306 249/102 |
| 6,120,100 | A | * | 9/2000 | Palazzolo | B29C 44/12 264/46.4 |
| 6,268,037 | B1 | * | 7/2001 | Butler | B29C 49/20 220/560.13 |
| 6,294,127 | B1 | * | 9/2001 | Huse | B29C 49/20 264/512 |
| 6,851,944 | B2 | * | 2/2005 | Effenberger | B29C 49/42 425/195 |
| 7,014,446 | B2 | * | 3/2006 | Hall | B29C 33/306 249/102 |
| 8,828,301 | B2 | * | 9/2014 | Furey | B29C 45/14065 249/102 |
| 2014/0263160 | A1 | * | 9/2014 | Guerin | B65D 1/40 215/384 |

FOREIGN PATENT DOCUMENTS

| | | |
|---|---|---|
| JP | 9-174670 | 7/1997 |
| JP | 2001-162674 | 6/2001 |
| JP | 2003-311817 | 11/2003 |
| JP | 2004-142245 | 5/2004 |

* cited by examiner

BLOW-MOLDING MOLD

FIELD OF THE INVENTION

The present invention relates to a blow-molding mold product such as fuel tanks, particularly, it relates to a blow-molding mold which has an air cylinder, the air cylinder can receive a pressure force to act on a nest mounting an insert member at the time of forming.

BACKGROUND ART

Patent documents 1-3 are known as prior arts to form an insert member integrally with a parison when performing the blow molding of the parison.

A structure is disclosed in patent document 1 in which an insert member is clamped between a clamping member and the tip of a sleeve when forming a hollow container from a parison by blow molding, the hollow container is made to extend at the time of forming outwardly from the inside of the insert member, then the insert member is formed integrally with the hollow container, after this, the hollow member is ejected from the mold by the hydraulic cylinder.

It is disclosed in patent document 2 that to insert an insert member into the inside of the parison unitarily, the parison is pushed to the insert member from one side by a press-board and is unified by the driving of a hydraulic cylinder after the insert member is received in a pipe-shaped parison.

It is disclosed in patent document 3 that to form an installation flange by injection molding on the outer side of a parison unitarily a part of the blow-molding mold is used as a mold for injection molding when forming a parison by blow molding.

PRIOR ART

Patent Documents

[Patent Document 1] Japanese Laid Open Patent 2003-311817

[Patent Document 2] Japanese Laid Open Patent H9-174670

[Patent Document 3] Japanese Laid Open Patent S63-62733

SUMMARY OF THE INVENTION

Problems Solved by the Invention

In patent document 1, a hydraulic cylinder receives a pressure on the outside at the time of forming the parison. The hydraulic cylinder can receive pressure force at the time of the forming, but this becomes a large-scaled device.

In patent document 2, the inserting of a member in a parison is assumed, this structure is not suitable for attaching an insert member to the outside of a parison unitarily.

In patent document 3, the other member is provided on the outside of a parison unitarily, but, the mold structure becomes complicated because the other member is formed by injection molding.

When integrating insert members such as insert rings on the outer side of fuel tanks using pressure force at the time of the forming, a large pressure force is applied to the nest which holds an insert member. To this end, a hydraulic cylinder is required to produce the pressure force to act on the nest, however the size of the device is increased when a hydraulic cylinder is used.

Means for Solving the Problems

To solve the above described problem, the blow-molding mold of the present invention, provides a mobile nest in which an insert member is set, the nest is connected with the plate which it provided in the back side of the mold, the nest can move forward and back in the mold by moving the plate by an air cylinder, also, the back side of the mold is provided with a locking device, the plate is locked in a condition that abutts with the back of the mold by this locking device, the nest maintains the position of the forward end.

As for the locking device, for example, it is conceivable to comprise a locking device with an air cylinder and a guide block, the rod of the air cylinder protrudes in a direction at right angles to the forward and back direction of the nest and along the back of the plate, the guide block receives the pressure force.

Effect of the Invention

Usually, for a cylinder unit which makes the nest move forward and back by receiving a pressure force acting on the nest at the time of forming, an oil pressure-type cylinder unit is used. For an oil pressure-style cylinder unit a large-scaled facility is needed, since a hydraulic pump, a hydraulic pump setting space and an oil pressure control circuit are required.

In contrast, according to the blow-molding mold of the present invention, because a plate locked on the back of the mold receives the pressure force acting on the nest at the time of forming, a cylinder unit which makes the nest move forward and back does not receive the pressure force. Then an air drive cylinder unit can be used as a drive medium.

As a result, a low air pressure (0.5-0.7 MPa), such as is frequently used in a factory, can be used as a drive source, the required facilities are simplified, less space is needed and cost is reduced.

Also, in addition, it is advantageous because it can use an air cylinder unit as a locking device in the same way.

BEST MODE FOR CARRYING OUT THE INVENTION

An embodiment of the present invention is explained below based on the attached drawings.

Blow-molding mold 1 consists of right and left divisional mold 1*a* and 1*b*, the divisional mold 1*a* is supported on a support 2*a* movable in a right hand direction, the divisional mold 1*b* is supported on a support 2*b* movable in a right hand direction.

A dice head 4 sending parison 3 out is provided at the upside of the middle position of right and left divisional mold 1a, 1b.

In the preferred embodiment, the position of the dice head 4 is fixed, the mold 1 for blow forming moves with the support to the position of the dice head 4.

Molten resin is sent into the dice head 4 by a screw feeder. The resin sent into the screw feeder becomes a pipe-shaped parison 3, and is located between the right and left divisional mold 1a, 1b.

Figure 1:
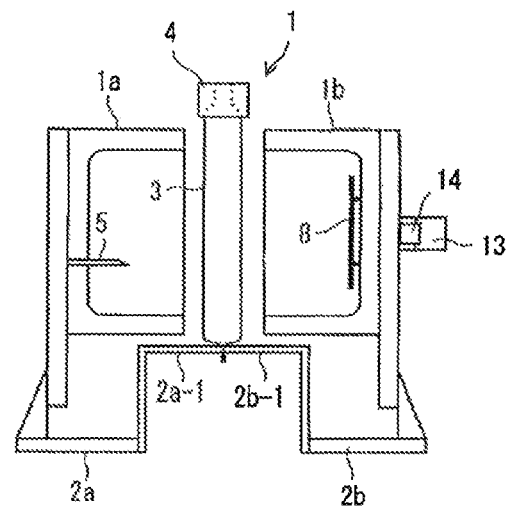
FIG. 1 General view of the blow-molding mold of the present invention showing previous closed state.

After this, in making the supports 2a and 2b come close, sandwich the parison by a pinch jig 2a-1 and 2b-1 which is provided on the supports 2a, 2b bottom end of the pipe-shaped parison 3. FIG. 1 shows this condition.

Also, a needle 5 is provided in the cavity of the divisional mold 1a, the needle 5 blows air into the parison 3, inflates the parison 3 and pushes the parison 3 to the inside of the mold.

Figure 2:
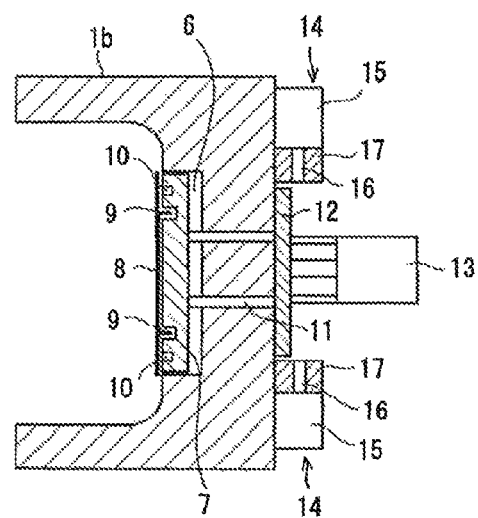
FIG. 2 Flat sectional view of essential part expansion of FIG. 1

On the other hand, as shown in FIG. 2, the forming surface of the divisional mold 1b is provided with flat recess 6, a nest 7 is received in the recess 6, the nest 7 is in the form of a board, the thickness of the nest 7 is thinner than the depth of recess 6, therefore, the nest 7 can move forward and back in the recess 6.

The nest 7 holds iron insert member 8 at the time of forming, therefore, a ditch 9 is formed on the inboard surface (plane toward to the cavity of the mold) of the nest 7, a protruding portion of the insert member 8 protrude into the ditch 9, in addition, a magnet 10 adhering to the insert member 8 is embedded on the outside of the nest 7.

Also, the back (outside surface) of the nest 7 is connected with the inner end of rod 11, the rod 11 penetrate through the divisional mold 1b, the outer end of the rod 11 is connected with plate 12, and the plate 12 is connected with air cylinder unit 13 which is anchored on the back side of the divisional mold 1b, the nest 7 moves back and forth in recess 6 by driving the air cylinder unit 13.

Herein, the reason to move the nest 7 forward and back in the recess 6 is to release the iron insert member 8 from the magnet after molding (after completed blowing).

That is, if the mold is opened without releasing the insert member 8 from the magnet 10, the product sticks to the divisional mold 1b, products such as fuel tanks cannot maintain their forming posture at the time of opening the mold, an undercut occurs in the convex shape portion of the product, contact is made with the main body in the mold, a scratch occurs, it is conceivable that in some cases the product cannot be taken out from the mold.

Also, the back side of the divisional mold 1b is provided with a locking device 14. In the preferred embodiment, the locking device 14 consists of an air cylinder unit 15 and a guide block 17, the axial direction of the air cylinder unit 15 is at right angles to the forward and back direction of the nest 7, a rod 16 of the air cylinder unit 15 penetrates through the guide block 17, the air cylinder unit 15 and the guide block 17 are provided in both sides of plate 12. Herein, the air cylinder 13, 15 just uses air (0.5-0.7 MPa) normally supplied in a factory, in particular, because the air cylinder unit 15 has the locking device 14, the pressure force at the time of the forming is not applied, then it is not necessary to use an oil pressure-type cylinder unit.

Also, the rod 16 of the air cylinder unit 15 functions as a stopper preventing the retreat of the plate 16 by the forming pressure. Therefore, the rod 16 approximately comes in contact with the outside plate 12 abutting with the back of the divisional mold 1b with projecting condition.

Figure 3:
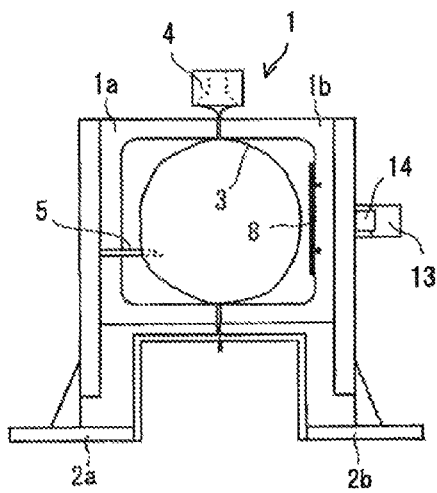
FIG. 3 General view showing closed state of the blow-molding mold.

To form parison 3, bring close together the right and left divisional mold 1a and 1b from the condition shown in FIG and close the mold shown in FIG. 3. Up to this condition, air is sent into the parison continuously from the dice head 4, the parison 3 swells out as illustrated. Also, when the parison 3 swelled out to a certain point, the needle 5 sticks in the parison 3, and it closes a mold, and air is sent to parison 3 through the needle 5 afterward.

Figure 4:
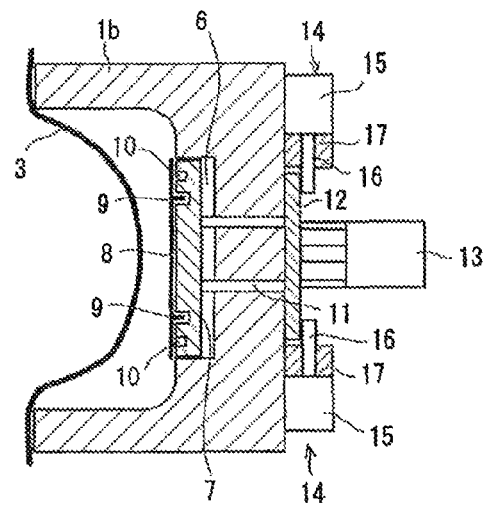
FIG. 4 Essential part expansion flat sectional view of FIG. 3

The above described condition that the mold is closed, as shown in FIG. 4, the plate 12 is sent off by the air cylinder unit 13 until it abuts with the back of the division side 1b, also, the nest 7 is at the position of the forward end. And the rod 16 protrudes along facies lateralis of plate 12 by drive of air cylinder unit 15.

Figure 5:
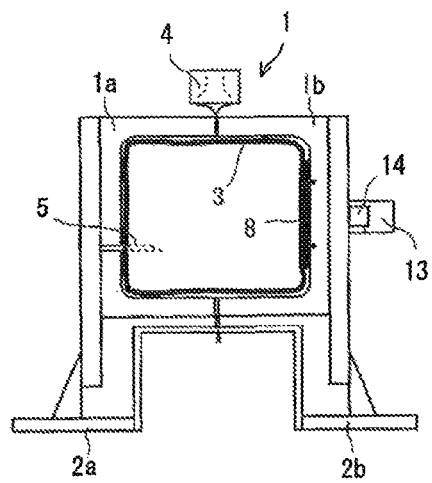
FIG. 5 General view showing closed state of the blow-molding mold.
Figure 6:
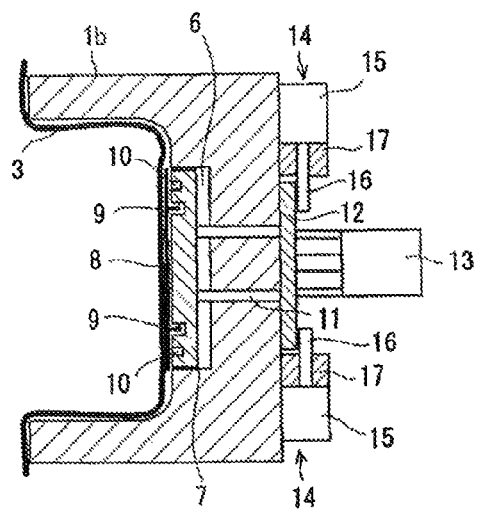
FIG. 6 An essential part expansion flat sectional view of FIG. 3.

From the condition which closed the above described mold as shown in FIGS. 5 and 6, air is fed into the parison 3 through the needle 5, and the parison 3 is pushed to the inside surface of the divisional mold 1a, 1b and forms. At this time, the parison 3 contacts with the inboard surface of the insert member 8 held by the nest 7 and the insert member 8 is joined to the outside parison 3.

Figure 7:
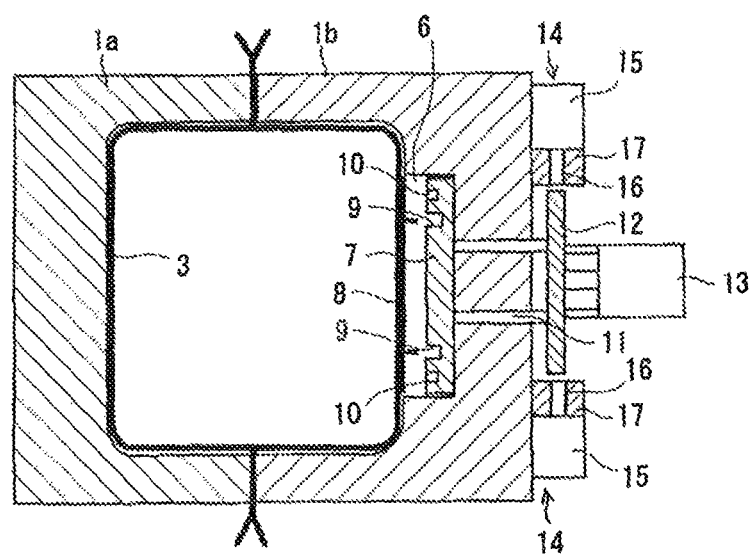
FIG. 7 General view showing closed state of the blow-molding mold.

After this, as shown in FIG. 7, the rod 16 is drawn back by driving the air cylinder 15, then the plate 12, and nest 7 are retreated by driving the air cylinder unit 15, then, because the insert member 8 bonds to the parison 3, only the nest 7 retreats. And the mold is opened by moving the divisional mold 1a and 1b and the product is removed.

Alternatively, in the preferred embodiment, the air cylinder unit 15 is shown as a factor to comprise the locking device 14, however, it can adopt the locking device that it applied the cam mechanism except this to.

INDUSTRIAL APPLICABILITY

The blow-molding mold of the present invention can be widely used for the forming of resin products as well as for the fuel tanks of vehicles such as automobiles.

EXPLANATIONS OF THE LETTERS AND NUMERALS

1 . . . blow-molding mold,
1a, 1b . . . divisional mold,
2a, 2b . . . support,
2a-1, 2b-1 . . . pinch jig,
3 . . . parison,
4 . . . dice heads,
5 . . . needles,
6 . . . recesses,
7 . . . nest,
8 . . . insert members,
9 . . . ditch,
10 . . . magnet,
11 . . . rod,
12 . . . plate,
13 . . . air cylinder unit,
14 . . . locking device,
15 . . . air cylinder unit,
16 . . . rod,
17 . . . guide block

The invention claimed is:

1. A blow-molding mold including a mobile nest in which an insert member is set, the mobile nest is connected with a plate, which is provided in a back side of the mold, the nest can move forward and backward in the mold by moving the plate via a first air cylinder, the back side of the mold is provided with a locking device, the plate is locked in a condition abutting the back side of the mold via said locking device, the nest maintains a position of a forward end, wherein the locking device is provided with a second air cylinder and a guide block, a rod of the second air cylinder protrudes in a direction at right angles to a forward and backward direction of the nest and along a back of the plate, the guide block receives a pressure force.

2. The blow-molding mold of claim 1, wherein a forming face of the mold is provided with a recess, the nest is rectangular shaped in cross-section and is received in the recess, a thickness of the nest is thinner than a depth of the recess.

3. The blow-molding mold of claim 1, wherein the nest is configured to hold an insert member.

4. The blow-molding mold of claim 3, wherein a ditch is formed in an inboard surface of the nest, the insert member includes a protruding portion received in the ditch.

5. The blow-molding mold of claim 1, wherein a second rod penetrating through the back side of the mold interconnects the nest and the plate.

6. The blow-molding mold of claim 1, wherein the rod is configured to directly engage the plate to lock the plate in the condition abutting the back side of the mold.

* * * * *